United States Patent Office 2,920,989
Patented Jan. 12, 1960

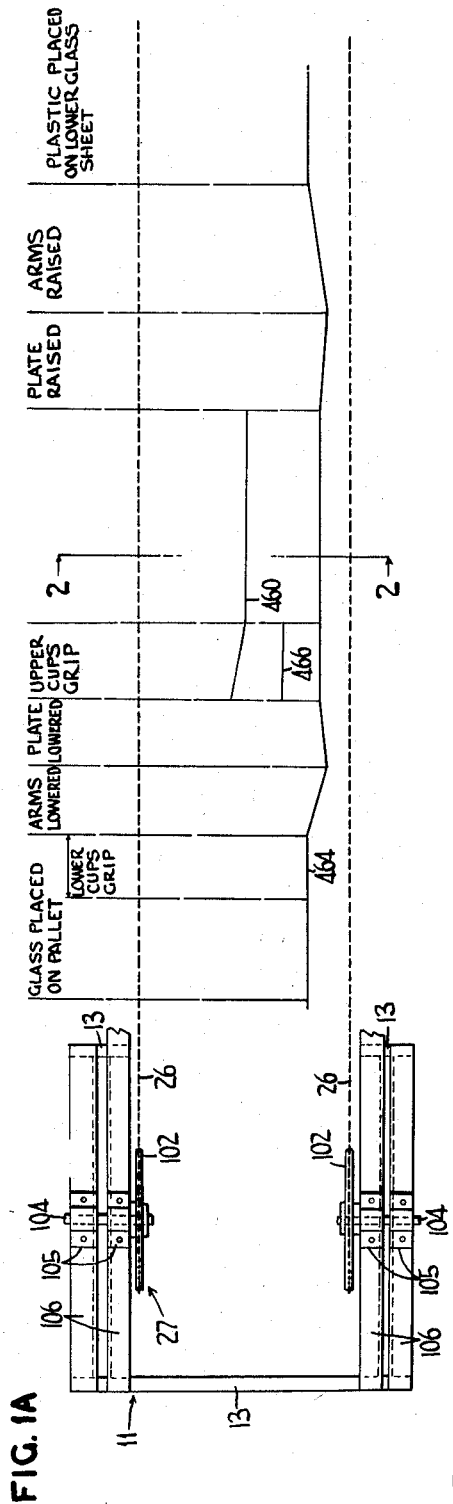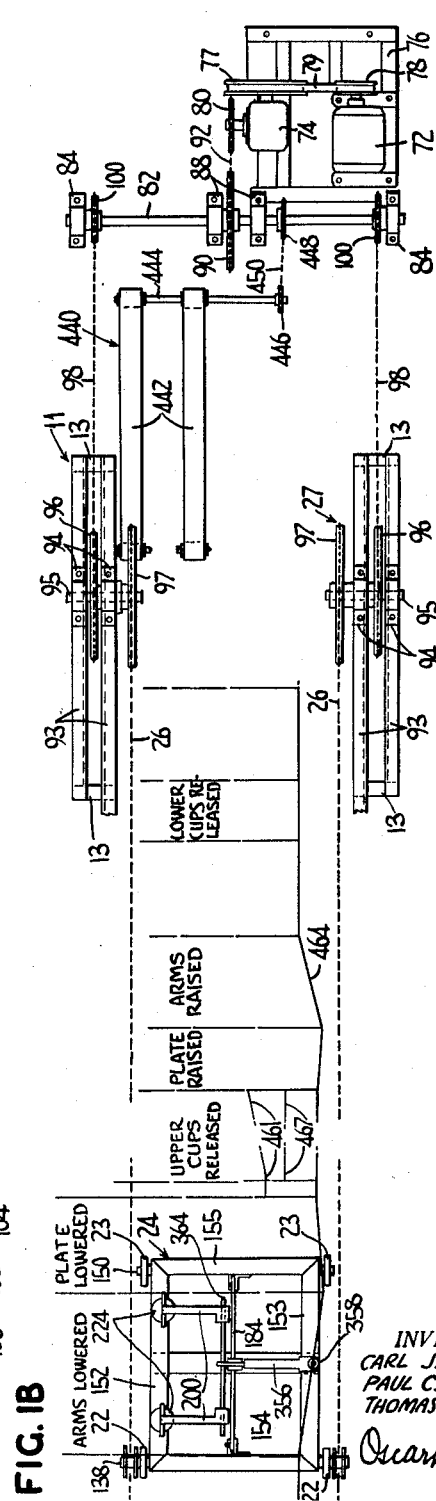

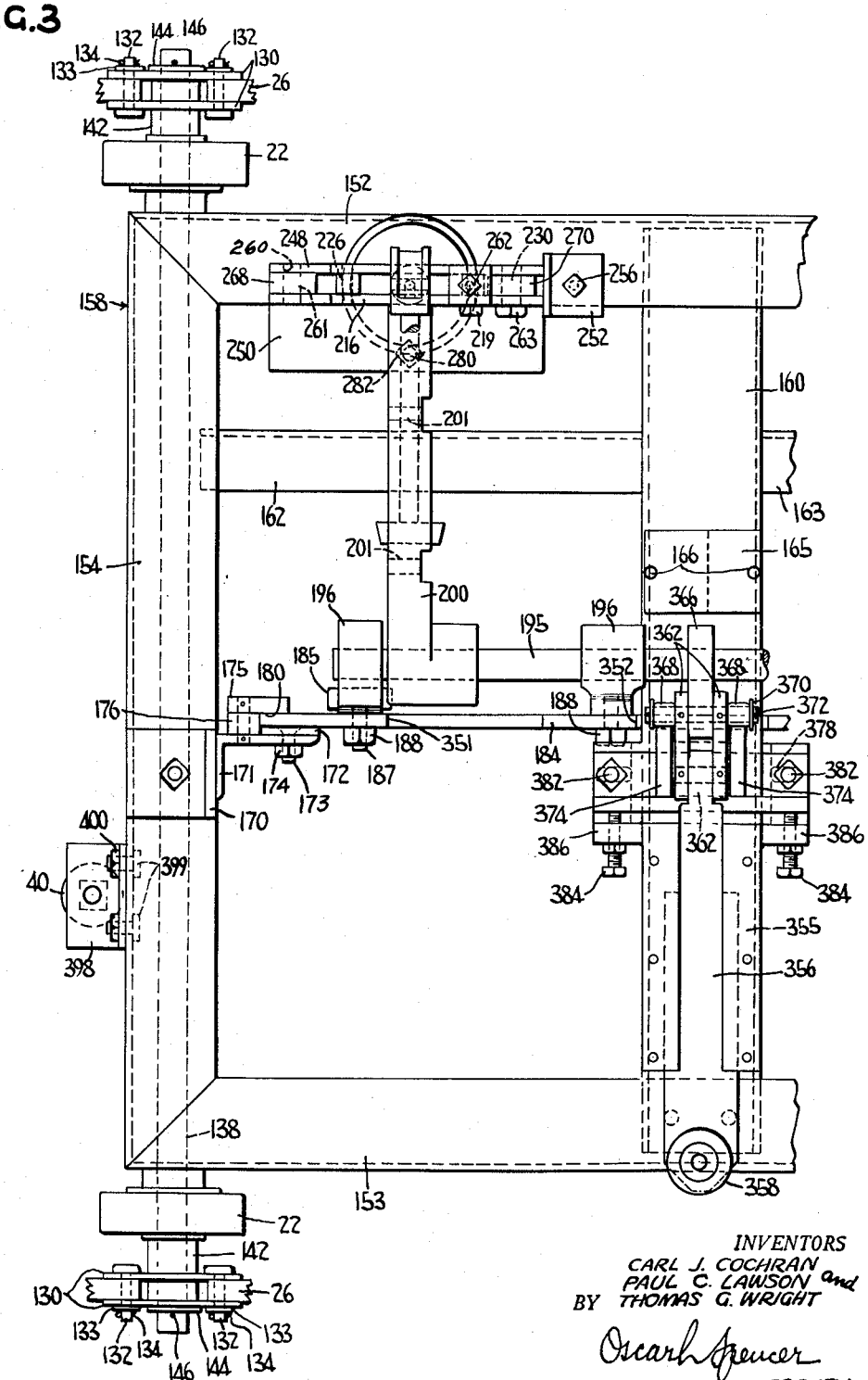

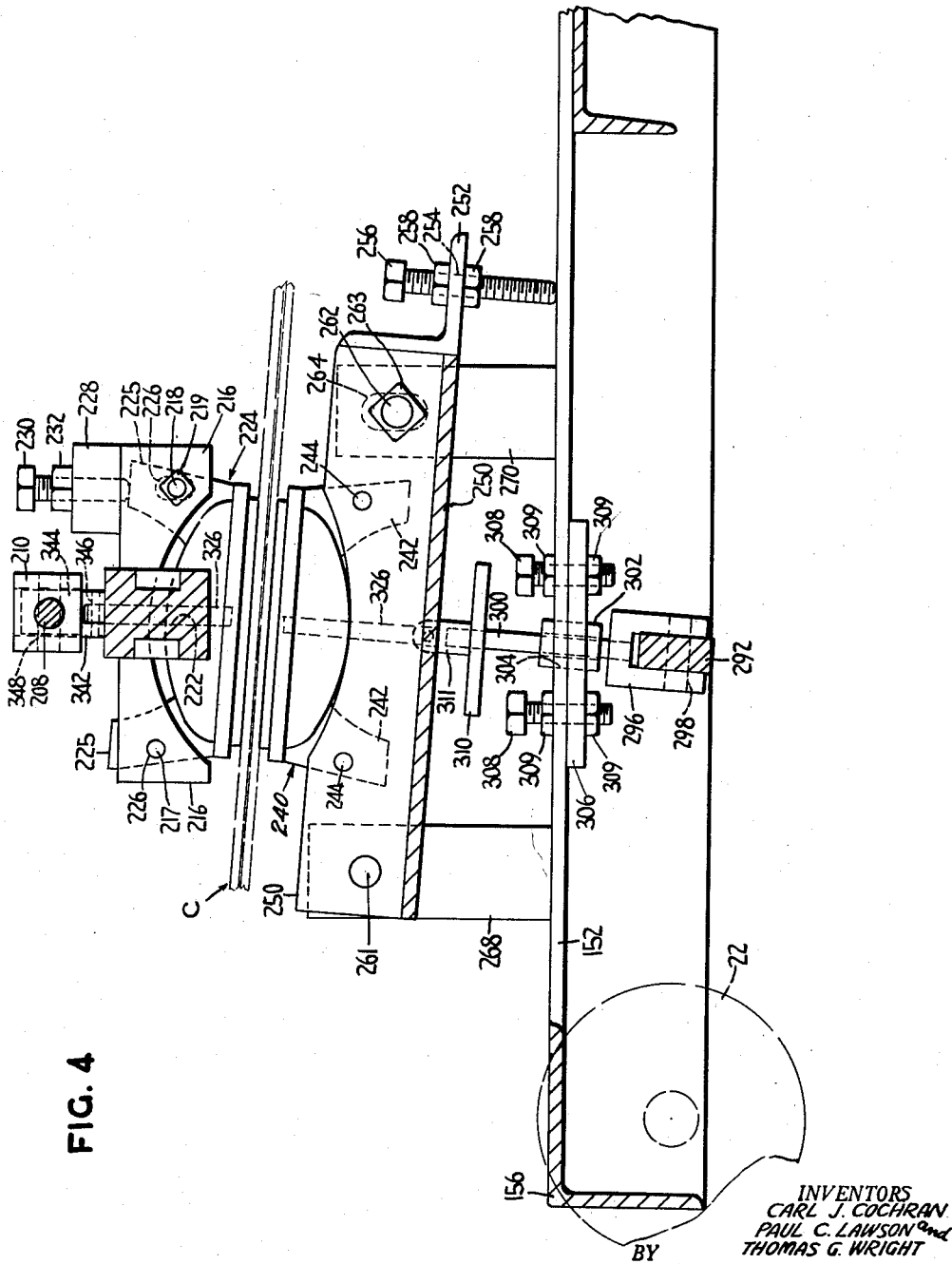

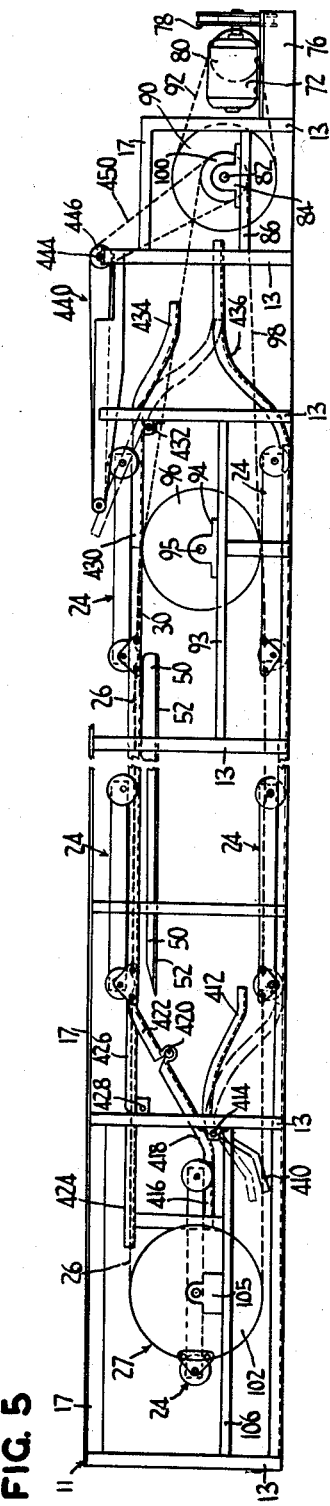
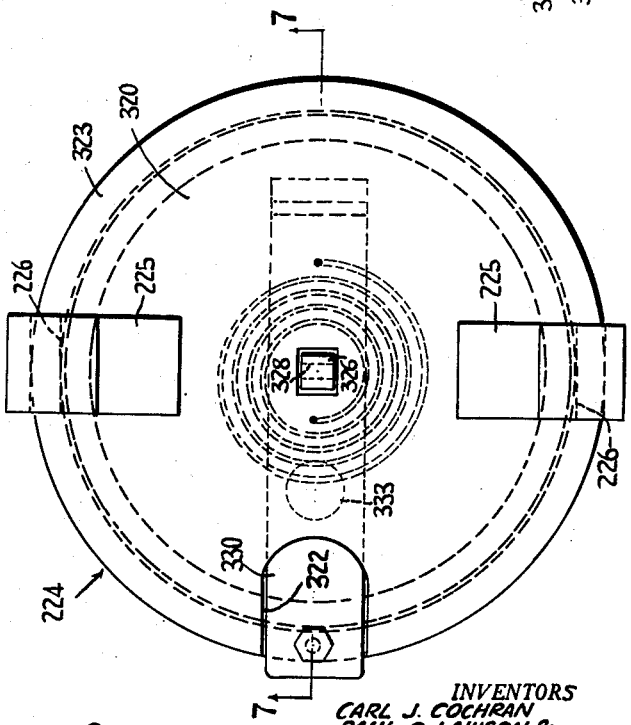

2,920,989

MACHINE FOR PREPARING COMPOSITE ASSEMBLIES

Carl J. Cochran and Paul C. Lawson, New Kensington, and Thomas G. Wright, Fox Chapel, Pa., assignors to Pittsburgh Plate Glass Company, Allegheny County, Pa., a corporation of Pennsylvania Application October 24, 1955, Serial No. 542,134

12 Claims. (Cl. 154—2.7)

This invention relates to a machine for preparing composite assemblies and more specially relates to the preparation of composite assemblies, each comprising a pair of matched curved glass sheets with a thermoplastic sheet therebetween.

In the preparation of curved safety glass, for example, curved windshields for automobiles, there is first manufactured a pair of curved glass sheets having the desired curvature. To obtain the best matching of curvature of two glass sheets to be used for the preparation of a curved safety glass by laminating or bonding between the glass sheets a thermoplastic interlayer, it is necessary that a pair of flat glass sheets be bent together in a lehr using a suitable bending mold. It is requisite that the matching relationship obtained in the bending operation be maintained in the preparation of the composite assembly of the matched sheets and a thermoplastic interlayer. In the method heretofore used it was necessary to move manually one of the matched curved glass sheets away from the other glass sheet in order to insert the interlayer therebetween. This manual operation did not insure that the removed glass sheet was returned to the matching position after the interlayer had been placed on top of the unmoved glass sheet.

The possibility of mismatching by improper repositioning of the one sheet on top of the other after placement of the interlayer made necessary a visual inspection and manual adjustment to insure that at least an approximate return to the matching relationship was accomplished. Because the thermoplastic sheet was slightly larger than the curved glass sheets so that all areas of the two glass sheets are separated by the thermoplastic material for adequate bonding in the subsequent laminating operation, the composite assembly had the thermoplastic sheet extending beyond the peripheries of the glass sheets. This extended portion of the sheet was translucent and interfered with the visual examination for the matching relationship of the two glass sheets.

In the process heretofore used and described above for preparing the composite assembly a pair of matched curved glass sheets was placed on a conveyor. While the pair was being moved by the conveyor, the top glass sheet was manually lifted and placed on the conveyor to provide a side-by-side relationship with the bottom glass sheet. At another zone of the conveyor path a thermoplastic sheet was positioned on the bottom glass sheet. Then the top glass sheet was placed over the thermoplastic sheet to form the composite assembly. The assembly was examined visually to check the matching of the glass sheets. The top sheet was repositioned to the extent determined by the limited visual examination.

It is an object of the present invention to provide a machine for separating a pair of matched curved glass sheets to insert a thermoplastic interlayer therebetween and for returning the glass sheets to their original matching relationship.

It is another object of the present invention to provide an apparatus by which the pair of matched curved glass sheets are separated mechanically in one zone, a thermoplastic sheet can be inserted therebetween in a second zone and the glass sheets are returned mechanically to their matching relationship in another zone so that the operation can be carried out on a continuous or production-line basis.

These and other objects of the present invention will be apparent to one skilled in the art from the description of the preferred embodiment of the apparatus of the invention which follows when taken in conjunction with the drawings, in which similar parts are designated by the same numeral and in which:

Figs. 1A and 1B show partly schematically and partly in a fragmentary top plan view the apparatus of the preferred embodiment with Fig. 1A showing the receiving end of the conveyor and the first sequence of operation and with Fig. 1B showing the latter sequence of operation along with one of the carriages, a portion of the discharge end of the conveyor and the take-off conveyor;

Fig. 3 is an enlarged fragmentary top plan view of a carriage of the apparatus;

Fig. 4 is an enlarged fragmentary cross section of the carriage taken along the line 4—4 of Fig. 2 and showing the top and bottom vacuum cups of one of the pairs on the carriage along with the construction for mounting the vacuum cups;

Fig. 5 is a fragmentary side elevation of the apparatus showing only the feeding and discharge ends of the conveyor along with a number of the carriages and the take-off conveyor;

Fig. 6 is an enlarged top plan view of a vacuum cup used in the preferred embodiment of the apparatus of the invention; and Fig. 7 is a cross section of the vacuum cup taken along the line 7—7 of Fig. 6.

Figure 2:
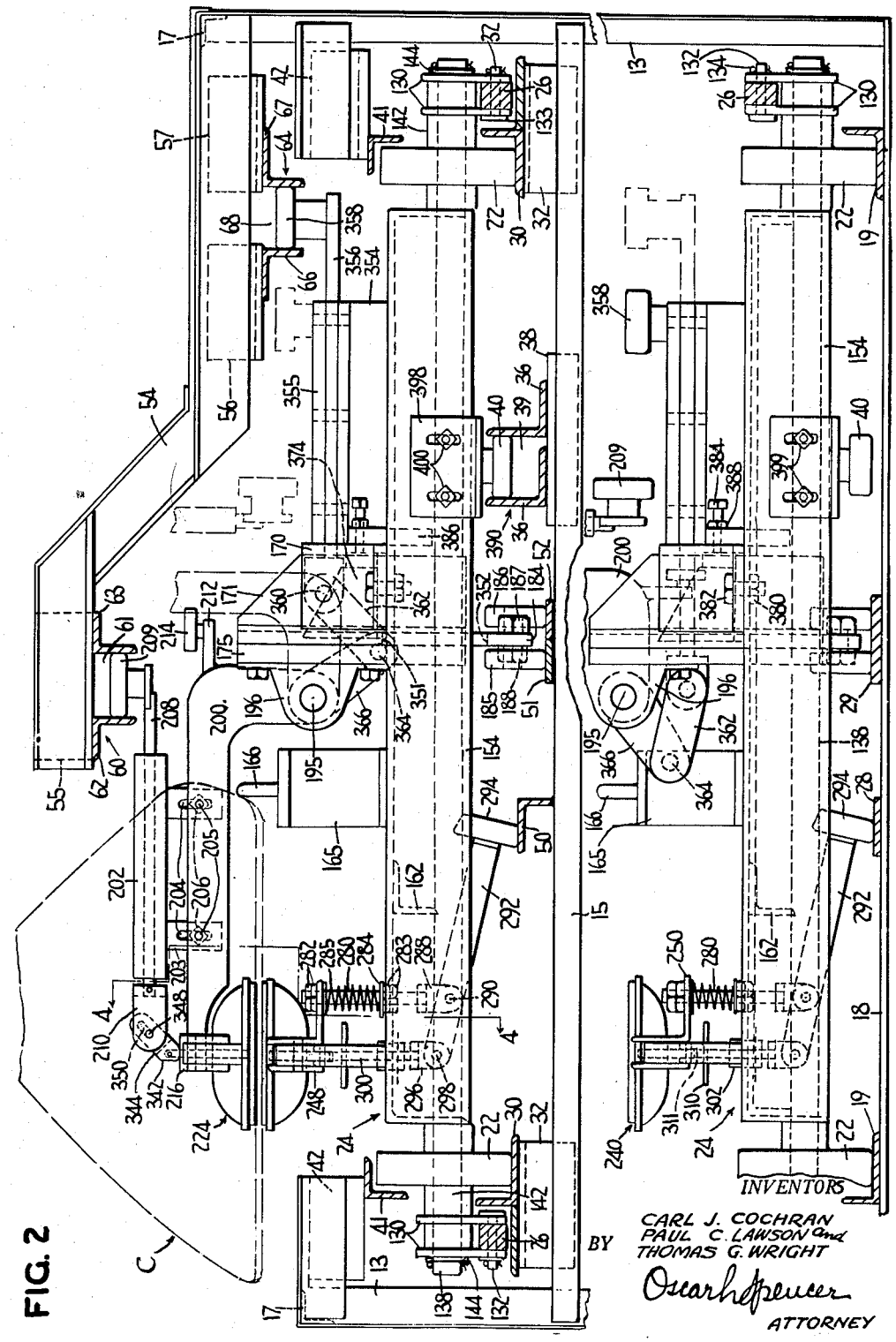
Fig. 2 is an enlarged vertical section of the apparatus taken along the line 2—2 of Fig. 1A and including pallets or carriages on the top and bottom runs of the conveyor in the zone in which the section line is located.

The apparatus of the preferred embodiments has a supporting structure generally indicated at 11 in Figs. 1A, 1B and 5. The supporting structure 11 has a number of vertical support members 13 arranged in two rows. Transverse horizontal support members 15 are welded to support members 13 intermediate the ends of support members 13. Welded to the top ends of vertical support members 13 in each row are horizontal members 17. A number of transverse horizontal bars 18 are welded to the bottom ends of vertical support members 13. Thus members 13, 15 and 17 and bars 18 cooperate to form a rigid supporting structure 11.

A pair of L-shaped members or rails 19 is arranged longitudinally in the supporting structure 11 by welding to transverse bars 18. A pair of wheels 22 and a pair of wheels 23 of a carriage generally indicated at 24 ride on rails 19 by movement of chains 26 of a conveyor, generally indicated at 27, in the bottom or return run of chains 26. Also welded on transverse bars 18 are flat bars 28 and 29 arranged parallel to rails 19.

A pair of inverted T-shaped members or rails 30 are mounted longitudinally in supporting structure 11 by welding on angle iron supports 32 welded to transverse members 15. Wheels 22 and 23 ride on rails 30 in the movement of carriage 24 with chains 26 in their top run. Wheels 22 and 23 are maintained in a parallel path in the top run by means of a pair of angle iron members 36 extending longitudinally in the supporting structure 11 and welded to angle iron supports 38 that are welded to transverse support members 15. Angle iron members 36 provide a longitudinal channel 39 therebetween. Roller 40 of carriage 24 rides in a longitudinal direction in channel 39 with rolling contact against angle iron members 36. Transverse movement of carriage 24 is also prevented by means of longitudinal angle iron members 41 above and beside wheels 22 and 23. Members 41 are supported by angle iron brackets 42 welded thereto and to vertical support members 13.

Cam rails 50, 51, and 52 are mounted longitudinally in the supporting structure 11 by being welded to transverse support members 15. Rails 50, 51 and 52 do not extend the full length of supporting structure 11 but rather extend longitudinally only as far as shown in Fig. 5.

Connected to some of the vertical support members 13, on the right-hand side as viewed in Fig. 2, are overhanging support members 54 to which are welded angle iron brackets 55, 56 and 57. Welded to angle iron 55 is a cam rail generally indicated at 60 and having a channel 61. Cam rail 60 is provided with a channel 61 by constructing rail 60 of a pair of angle iron members 62 and 63. A cam rail generally indicated at 64 likewise is constructed of a pair of angle iron members 66 and 67 to provide a channel 68. Member 66 is welded to angle iron member 56 and member 67 is welded to angle iron member 57.

As seen in Figs. 1B and 5 a motor 72 and a gear reducer 74 are mounted on a supporting platform 76 at one end of supporting structure 11. Motor 72 drives gear reducer 74 by means of pulleys 77 and 78 and belt 79. Gear reducer 74 drives keyed sprocket 80. A shaft 82 is supported by pillow blocks 84 mounted on horizontal supporting members 86. Each of supporting members 86 is welded on one side of supporting structure 11 to two of the vertical supporting members 13. A pair of centrally disposed pillow blocks 88 are mounted on transverse horizontal supporting members (not shown) welded to horizontal supporting members 86. Shaft 82 is rotated by means of sprocket 90 keyed on shaft 82, chain 92 and sprocket 80. At the right hand end of conveyor 27 between vertical support members 13 are welded two pairs of horizontal angle support members 93. Mounted on support members 93 are four pillow blocks 94 supporting shafts 95. Keyed on shafts 95 are a pair of sprockets 96, one on each side and a pair of sprockets 97 also one on each side. Chains 98 engage sprockets 96 and sprockets 100 keyed on shaft 82 so that rotation of shaft 82 rotates shafts 95. Conveyor chains 26 of conveyor 27 engage sprockets 97.

At the other end of the supporting structure 11, as seen in Fig. 1A, chains 26 engage sprockets 102 keyed on shafts 104. Shafts 104 are supported by pillow blocks 105 mounted on two pairs of horizontal support members 106 welded at their ends to vertical support members 13.

The chains 26 are of the link-chain type and in place of the customary links at a number of points spaced along each chain 26 there is used a pair of link plates 130 that are connected to the sections of chains 26 by means of pins 132 held in place by means of washers 133 and cotter pins 134. Each of the plates 130 has an additional hole for mounting of plates on an axle 138 of each carriage 24. The pair of plates 130 linking sections of chains 26 are spaced from wheels 22 by means of spacers 142. The pair of plates 130 that are rotatively mounted on each end of axle 138 is maintained on axle 138 by means of washer 144 and cotter pin 146.

A number of carriages 24 is connected to chains 26 as described above. Each of carriages 24 is provided with another axle 150. Both axle 138 and axle 150 are rotatively mounted about parallel axes to angle iron frame members 152 and 153 that are mitered at their ends as shown in Fig. 3 and are welded to a similar pair of mitered angle iron frame members 154 and 155 to form a supporting frame 158 of carriage 24. Welded to frame members 152 and 153 is a supporting channel member 160 parallel to and between frame members 154 and 155. A pair of angle iron supports 162 and 163 are welded to frame members 154 and 155, respectively, and both are welded to channel member 160. Mounted on supporting channel member 160 is a bracket 165 on which is mounted a pair of outwardly extending pins 166 to properly position a pair of matched curved glass sheets, the outline of the pair being shown in Fig. 2 in dotted lines and generally indicated at C. Bolted to frame members 154 and 155 are brackets 170 to which are welded brackets 171. A wear bar 172 is fastened to each of brackets 171 by means of bolts 173 and nuts 174. A bar 175 is fastened to each of brackets 171 and spaced therefrom by spacer bars 176 to provide between bar 172 and bar 175 a vertical channel 180. A sliding support plate 184 is mounted in channels 180. A pair of wheels 185 and 186 are mounted to the bottom end of plate 184 and near opposite ends. Wheels 185 and 186 are mounted on opposite sides of plate 184 and ride on cam rails 51 and 52, respectively, in the top run of the conveyor 27 and both ride on plate 29 in the bottom run of conveyor 27. Wheel 185 is rotatively mounted to plate 184 by means of bolt 187 and wheel 186 is rotatively mounted to plate 184 by means of bolt 188.

A shaft 195 is supported in a horizontal position by means of pillow blocks 196 bolted to vertical sliding support plate 184. A pair of arms 200 is keyed to shaft 195. Each arm 200 is provided with holes 201. Mounted thereon is a guide bushing 202 having downwardly extending slotted flanges 203. Adjustability of mounting guide bushing 202 is provided because of slots 204 in flanges 203. Guide bushing 202 is fixed in position by bolts 205 and nuts 206. A bar 208 is supported in guide bushing 202. On one end of bar 208 is rotatably mounted a roller 209 to rotate about a vertical axis with arm 200 in the down position and to be positioned within channel 61 of cam rail 60 when carriage 24 is moving on the top run of conveyor 27. At the other end of bushing 202 a clevis 210 is connected.

Mounted on arm 200 by a support 212 is a roller 214. With arm 200 in the down position, roller 214 will move with rotation in a channel of a section of a cam rail (not shown) mounted on overhanging support members 54. This cam rail (not shown) is in disconnected longitudinal sections and these sections are present only in those sections of the apparatus where a portion of cam rail 60 is nonparallel to the rails 30 to force bar 208 by means of roller 209 to slide in bushing 202 and thus move relative to arm 200. The roller 214 thus cooperates with this cam rail (not shown) to prevent movement of arm 200 during movement of bar 208 to the right or left as viewed in Fig. 2.

The free end of arm 200 has two bifurcated flanges 216 extending in opposite direction. Each of flanges 216 contain holes to receive pin 217 and bolt 218 on which is threaded nut 219. The arm 200 between the flanges 216 has a downwardly extending hole 222.

Mounted to each of the arms 200 of carriage 24 is a top vacuum cup generally indicated at 224. The cup 224 has mounting wings 225 and is fastened to arm 200 by wings 225 in the channels provided in each of the bifurcated flanges 216 with pin 217 and bolt 218 passing through holes 226 in wings 225. As seen in Fig. 4, one of holes 226 is slotted. Welded on one of flanges 216 is a plate 228 having a threaded hole 229. A bolt 230 is threaded in hole 229 and locked in position by nut 232. Bolt 230 engages the wing 225 having the slotted hole 226 thereby permitting pivotal adjustment of cup 224 about the pin 217 in the non-slotted hole 226. This permits variation in the tilting of cup 224 for better contact with the top surface of the top sheet of the pair of matched glass sheets C.

A bottom vacuum cup generally indicated at 240 is mounted below each of the top vacuum cups 224 on a carriage 24. Vacuum cup 240 has wings 242 that are mounted by means of pins 244 to flat support rod 248 and angle iron support 250. Supports 248 and 250 are welded at one end to an angle iron connector 252 having a hole 254. A bolt 256 extends through hole 254 and is adjustably positioned by means of nuts 258. Supports 248 and 250 each have a pair of holes 260 to receive pin 261 and bolt 262, on which is threaded nut 263. Pin 262 and bolt 263 are mounted in holes 264, one being slotted, of supporting members 268 and 270, respectively. Supporting members 268 and 270 extend upwardly from frame member 152, to which they are welded, and extend between supports 248 and 250. The slotted hole 260 permits adjustment of tilt of cup 240 by turning bolt 256 to pivot bottom cup 240 about pin 261 to provide the proper contact with the bottom surface of the pair of matched glass sheets C.

The support 250 also supports a rod 280 in a vertical position by means of nuts 282 threaded on rod 280 above angle iron support 250 and nuts 283 threaded on rod 280 below and spaced from support 250 by means of washers 284 and spring 285. This arrangement provides resilient mounting of rod 280 to support 250. A clevis 288 is connected to the bottom end of rod 280. A pin 290 is mounted through clevis 288 and engages a lever 292 so that pin 290 serves as a pivot axis for lever 292. At one end of lever 292 is rotatively mounted a wheel 294 to engage cam rail 50 in the top run of conveyor 27 and bar 28 in the bottom run. At the other end of lever 292 is connected a clevis 296 by means of pin 298. Connected to clevis 296 is a rod 300 passing upwardly through a sleeve-bearing 302 mounted in a hole 304 of frame member 152. Sleeve-bearing 302 is welded to a plate 306 (Fig. 4) that is fastened to frame member 152 by means of bolts 308 and nuts 309. The height of bolts 308 can be adjusted individually, of course, and bolt 308 act as stop members for circular base 310 of clevis 311 connected to the top end of rod 300.

Figs. 6 and 7 show vacuum cup 224, which is identical to vacuum cup 240. They are the type that is used in the preferred embodiment of the apparatus of the present invention. This type of vacuum cup has a rigid dome 320 having a central aperture 321 and a cut-away section 322 adjacent the peripheral flange 323. A flexible rubber sheet 325 is placed near the base of the rigid dome between the peripheral flange 323. A rod 326 is vulcanized to rubber sheet 325 in the central area and extends upwardly through aperture 321. The end of rod 326 extending upwardly beyond dome 320 has a hole 328.

Between rubber sheet 325 and the upper portion of dome 320 is a plate 330 offset downwardly at one end (to the right in Fig. 7) and having a hole 331 through which passes rod 326. To the undersurface of plate 330 a soft rubber pad 333 is fastened by adhesive. A spring 335 is mounted between plate 330 and dome 320 and around rod 326. Spring 335 biases downwardly plate 330 toward rubber sheet 325. With rubber sheet 325 in the normally flat position the soft rubber pad 333 is spaced slightly above rubber sheet 325 by means of an adjusting bolt 336 threaded in aperture 337 of plate 330. The end of bolt 336 rests on flange 323. Adjustment of the height of plate 330 can be made by rotation of bolt 336 and nut 338. It can be seen from Fig. 7 that, when rod 326 is pulled upwardly as viewed in that figure, rubber sheet 325 becomes bowed as indicated in dotted lines, so that the hole 340 in rubber sheet 325 becomes closed by engagement of soft rubber pad 333 by sheet 325. Further raising of rod 326 will create a vacuum below rubber sheet 325 when vacuum cup 224 (and, of course, cup 240) is maintained in contact with the surface of the glass sheet.

The rods 326 of top and bottom cups 224 and 240 are connected as shown in Fig. 4 to clevis 311 and a clevis end 342 of a cam member 344. Thus movement of rod 300 downwardly, as viewed in Fig. 4, will move rod 326 of bottom vacuum cup 240 so that vacuum cup 240 supporting the pair C of glass sheets will engage the bottom surface of pair C by creating a vacuum. The top of rod 326 of top vacuum cup 224 extends through aperture 222 of arm 200 and is connected to the clevis end 342 of cam member 344 by means of pin 346. The other end of cam member 344 is mounted between clevis 210 by means of pin 348 passing through slotted aperture 350 of cam member 344. Thus sliding movement of bar 208 because of change in direction of cam rail 60 will result in pulling or pushing on clevis 210. This will result in rotation of cam member 344 about pin 348. The cam surface of member 344 rests against the top surface of arm 200 and rotation of cam member 344 about pin 348 raises or lowers rod 326 of top vacuum cup 224. As seen in Fig. 2, cam member 344 has been pulled to the right resulting in lifting of rod 326 of cup 224 to bow sheet 325. From the description above, it is apparent that in this position cup 224 has become secured to the top surface of matched pair C by creation of a vacuum between rubber sheet 325 and said top surface.

Arms 200 are keyed to shaft 195 so that rotation of shaft 195 results in raising arm 200 from the horizontal position shown in the top run of conveyor 27 (Fig. 2) to the vertical position shown in dotted lines in the top run and shown as the normal position of raised arm in the bottom run of the conveyor 27. To permit the rotation of arms 200 as shown in Fig. 2, plate 184 is notched at two places 351 at the top of the plate for both arms 200 to permit their rotation as indicated by the dotted lines in the top run. A similar but deeper notch 352 in plate 184 is made in the top central portion.

Mounted on supporting channel member 160 is a supporting bar 354 on which is fastened a guide bushing 355 for a slide bar 356. At one end (to the right as viewed in Fig. 2) of bar 356 is rotatively mounted about a vertical axis a roller 358 to be engaged cam rail 64. The other end of bar 356 has a horizontal aperture through which is rotatively mounted a shaft 360. Also mounted on shaft 360 is a linking member 362 being bifurcated at each end. The linking member 362 is connected at one bifurcated end to shaft 360 by set screws (not shown). The other bifurcated end of linking member 362 also has horizontal hole in alignment in the two sections of the bifurcated end to receive a shaft 364. Mounted on shaft 364 between the two sections of the bifurcated end of linking member 362 is a linking member 366 that also has a horizontal hole at the other end through which is mounted shaft 195. Linking member 366 is fastened to shaft 195 by means of a set screw (not shown). Linking member 366 is rotatable on shaft 364. Linking member 362 is rotatable on shaft 364.

Mounted on shaft 364 are bearings 368 (Fig. 3) held against linking member 362 by means of washers 370 and cotter pins 372. A pair of plates 374 abut bearings 368 to limit movement, to the right as viewed in Fig. 2, of shaft 364. Each of plates 374 has a flat vertical surface adjacent bearings 368. The plates 374 each have a horizontal flange having a hole in alignment with a slot 378 in channel member 160. A nut 380 and bolt 382 fasten each plate 374 to channel member 160. By loosening nut 380 plate 374 can be moved toward or away from bearing 368 by means of bolt 384 threaded in vertical bar welded to channel member 160 and to bar 352. Bolt 384 after adjustment of a plate 374 is fixed into position by means of nut 388 and then plate 374 is fixed by tightening nut 380 on bolt 382. Thus it is seen that plates 374 serve as stop members and guide plates for shaft 364 to limit the lowering of arms 200 by the movement to the right of slide bar 356. Plates 374 also insure the vertical movement of shaft 364 with vertical movement of plate 184.

Because rails 30 do not prevent carriages 24 from moving transversely while moving longitudinally on the top run of the conveyor 27, as can be seen in Fig. 2, the transverse movement is prevented by means of a cam rail 390 formed of angle iron members 36 to provide channel 39 in which moves longitudinally roller 40 rotatively mounted about a vertical axis to bracket 398 adjustably mounted to frame member 154 by means of bolts 399 and nuts 400. A cam rail similar to rail 390 is not required in the bottom run of conveyor 27. Rail 390 is required because there is a transverse force applied to carriage 24 by means of cam rail 60 or cam rail 64 in some sections of the top run of conveyor 27 by the change in direction of rail 60 or 64, to the left or right as viewed in Fig. 2, to move slide bar 208 or slide bar 356.

Rails 19 in the bottom run of conveyor 27 extend, as shown in Fig. 5, to the far left side to a point farther to the left than the axis of sprocket 102. Before the wheels 22 on axle 138 of carriage 24 have moved to the left, as viewed in Fig. 5, to a point where chains 26 engage sprocket 102, wheels 22 move counterweighted arms 410 upwardly to a position shown in dotted lines. Each of arms 410 is welded to a rail 412 made of angle iron and pivotally mounted on a shaft 414 supported by vertical members 13. Rails 412, that are held above rails 19 by counterweight arms 410 so that wheels 22 can pass thereunder, are moved by wheels 22 and arms 410 downwardly to rest on rails 19 before and until wheels 23 on axles 150 have moved to this point to the left and then started up rails 412. Wheels 23 will ride rails 412 to horizontal rails 416 while the left end of carriage 24, as viewed in Fig. 5, is being raised by connector link plates 130 being engaged by sprocket 102 that is rotating clockwise. A pair of rails 418 pivotally mounted on shaft 420, that is mounted to the supporting structure 11 by a support (not shown), is lifted up from rail 416 by wheels 23 moving to the left on rail 416. As soon as wheels 23 have moved to the left off rails 412 and onto rails 416, rails 412 rotate about shaft 414 due to counterweight arms 410. Also as soon as wheels 23 have moved on rails 416 to the position indicated by the carriage to the far left of Fig. 5, rails 418 fall back down onto rail 416. The direction of carriage 24 is now reversed because connector link plates 130 are now engaging sprocket 102 in its arc now moving upwardly and to the right. Thus wheels 23 will move up rails 418 and a pair of rails 422 forming a downward extension of rails 30 of the top run of conveyor 27 and being supported at the end by the support for shaft 420. A pair of rails 424 are mounted as shown in Fig. 5 to receive wheels 22 when the connector link plates 130 move away from engagement with sprocket 102. The wheels 22 then move to the right on rails 424 to rail sections 426 pivotally mounted on shaft 428 mounted to vertical supporting members 13. Because rails 426 are pivotally mounted at the left end and because their right end as viewed in Fig. 5 rests normally on rails 30, the wheels 23 of carriage 24 will lift up rails 426 as wheels 23 are moved to the right up rails 422 until wheels 23 reach rails 30. Then rails 426 drop to position on rails 422 to provide a passage from rails 424 to rails 30 for wheels 22.

In the next preceding paragraph the transfer of carriages 24 from the bottom run of conveyor 27 to the top run at the feeding or loading end has been described. A similar arrangement is used at the unloading of conveyor 27. In this case the top rails 30 extend to about the sprocket 96. A pair of rails 430 pivotally mounted on supporting members 13 by means of shaft 432 extend to the right end of rails 30. Rails 430 have downwardly offset end portions 434 to the right of shaft 432 (Fig. 5). The weight of wheels 23 moving to the right down offset rail portions 434 of rails 430 results in the downward movement of offset rail portions 434 until rail portions 434 rests (as shown in dotted lines) on upwardly offset end portions 436 of rails 19. After wheels 23 start to the right down rail portions 434 that results in raising rails 430 about rails 30, the connected plates 130 of carriage 24 engage sprocket 96 so that wheels 22 move with the carriage 24 to the right and downwardly. Wheels 22 will not be able to run on or be stopped by rails 430 because they have been raised above the height of wheels 22. Wheels 22 are supported by the chains 26 moving around sprocket 96. When wheels 23 move off rail portions 434, rails 430 by counterweights (not shown) returns to the normal position by counterclockwise rotation, as viewed in Fig. 5, lifting rail sections 434 above the height of wheels 23 on rails 436. This rotation permits wheels 23 on reversal of movement of carriage 24 to roll to the left down rail portions 436 when plates 130 engage sprockets 96 in the lower, right-hand section of the rotation, as viewed in Fig. 5. Plates 130 of chains 26 disengage sprockets 96 when wheels 22 rest on rails 19. Further movement of carriage 24 to the left by chains 26 moves wheels 23 from rail portions 436 to the horizontal or main portion of rails 19.

Mounted at the discharge end of conveyor 27 is a take-off conveyor generally indicated at 440 and comprising two belt conveyors 442 being driven by shaft 444 rotated by sprocket 446 connected to sprocket 448 by chain 450. The belt conveyors 442 are spaced apart in a direction to the longitudinal direction of conveyor 27 and are mounted so that the top run of each is in the same direction as the top run of conveyor 27. They are positioned in their spaced-apart relationship to receive the composite assembly from carriage 24 at the end of conveyor 27 at which point arms 200 are raised out of position and bottom cups 240 are no longer engaging the bottom surface of the composite assembly. The belt conveyors 442 are also in a position to the right of the axis of sprockets 96 so that when the composite assembly reaches the belt conveyors 442 the right end, as viewed in Fig. 5, of carriage 24 is moving downwardly.

The take-off conveyor 440 transfers the composite assembly to another conveyor (not shown) and the latter conveys the assemblies either to preliminary pressing machines after which the assemblies are subjected to a final pressing in the customary manner or the assemblies are taken off the conveyor (not shown) and subjected to bonding by other methods that have been developed to prepare a laminated composite assembly.

The operational steps of conveyor 27 are shown reading from left to right in Figs. 1A and 1B. It is seen at first that the pair C of matched curved glass sheets is placed on carriage 24. Then the lower cups 240 grip the lower surface of the matched pair C because in this zone of the apparatus the height of rail 50 increases to rotate lever 292 about pin 290 thereby pulling downwardly rod 300 of vacuum cup 240 to create the vacuum. Further along the conveyor to the right, as viewed in Fig. 1A, arms 200 are lowered by the movement to the right, as viewed in Fig. 2, due to the change in direction to the right at this section of the conveyor of cam rail 64. In the next section of Fig. 1A of conveyor 27, the sliding plate 184 is lowered by the sloping downwardly, to the height shown in Fig. 2, first of rail 51 and then of rail 52 on which wheels 185 and 186 ride. The slopes are the same but spaced longitudinally so that the plate 184 lowers without tilting shaft 195 from its horizontal axis. Because movement of plate 184 results in movement of bar 356 due to linking members 362 and 366, the cam rail 64 slants slightly to the left to a new longitudinal plane as viewed in Fig. 2. Up to and including this zone rail 60 is not present and, of course, overhanging support 54 does not extend as far to the left as indicated in Fig. 2.

During the next zone of conveyor 27, cam rail 60 begins and changes direction to the right, as viewed in Fig. 2, to move bar 208 to the right. By this movement cam member 344 rotates to move rod 326 of cup 224 upwardly, so that vacuum cup 224 engages the top surface of the matched pair C.

The carriage 24 moves along the conveyor for a considerable distance before cam rail 60 stops and before the next steps of the operation which are first the raising of arms 200 and attached top sheet of glass by raising plate 184 by wheels 186 and 185 moving upwardly due to the upward curving of the rails 52 and 51. The upward curvature of rails 52 and 51 is identical but they start at different points along the conveyor to maintain shaft 195 of plate 184 in a horizontal position. At the same time rail 64 changes its direction slightly to the right because of the movement of bar 356 by upward movement of plate 184.

In the next zones of conveyor 27, rail 60 is also not present. In the first of these zones arms 200 are raised by the change of direction of cam rail 64 until it reaches a plane to the left, as viewed in Fig. 2, until arms 200 (with the top glass sheet attached) is rotated with the arms about the axis of shaft 195, until arms 200 are in the position indicated in dotted lines in Fig. 2 in the top run. The carriage with the arms in this position then moves along the conveyor a considerable distance and in this section of the conveyor the thermoplastic sheet, such as Vinal which is a plasticized polyvinyl butyral, is placed on the lower glass sheet that is secured to lower vacuum cup 240. In the next zone to the right, arms 200 are lowered by the change in direction to the right of cam rail 64 to the longitudinal plane as viewed in Fig. 2. In the next section of plate 184 is lowered in the manner previously described with the change of contour of cam rails 51 nad 52 for the reason already mentioned.

In the next zone of operation of the conveyor 27, in which carriage 24 moves to the right in Fig. 1B, upper cups 224 are released because of the change of curvature to the left of a section of cam rail 60 that starts and stops in this zone.

In the next zone plate 184 is raised in a manner previously described and in the following zone arms 200 are raised. In the final zone lower cups 240 are released by decreasing height of cam rail 50. In the conveyor section to the right of the final zone of operation the composite assembly of the two matched curved glass and a thermoplastic interlayer sheets is taken off conveyor 24 by take-off conveyor 440. The vertical lines in Figs. 1A and 1B separate the various zones of operation as the carriage 24 moves from left to right. Lines 460 and 461 show contours of the cam surfaces of the disconnected sections of cam rail 60. A line 464 moving from left to right also between chains 26 in Figs. 1A and 1B represents the contour of the cam surface of cam rail 64 and also the change or position of roller 358. The contour of the disconnected sections of the cam surface of the cam rail (not shown) for engagement of roller 214, as described above, is also shown in Figs. 1A and 1B as lines 466 and 467.

The foregoing is a description of a preferred embodiment of the apparatus of the present invention. It is presented for the purpose of illustration only. It is recognized that many changes can be made from the preferred embodiment by one skilled in the art without departing from the spirit of the invention. The invention is not limited by this example but is limited only by the claims that follow.

We claim:

1. An apparatus for preparing a composite assembly comprising two matched curved sheets of glass and a thermoplastic interlayer, which comprises a carriage, a supporting structure, conveyor means mounted on the supporting structure for moving the carriage, a first vacuum cup mounted on the carriage to support a pair of matched curved glass sheets, a first vacuum-cup-actuating means to secure the first vacuum cup to the undersurface of the supported pair of matched sheets, a support, a second vacuum cup mounted on the support, said support being movably mounted on the carriage to move the second vacuum cup from a first position away from the top surface of the pair of matched sheets to a second position in contact with said top surface, a second vacuum-cup-actuating means to secure the second vacuum cup to the top surface of the supported pair of matched sheets, and means mounted on the supporting structure for moving said support during actuation of said second vacuum cup.

2. An apparatus for preparing a composite assembly comprising two matched curved sheets of glass and a thermoplastic interlayer, which comprises a carriage, a supporting structure, conveyor means mounted on the supporting structure for moving the carriage in a plane, a first vacuum cup mounted on the carriage to support a pair of matched curved glass sheets, a first vacuum-cup-actuating means to secure the first vacuum cup to the undersurface of the supported pair of matched sheets, a support pivotally mounted to the carriage, a second vacuum cup mounted on the support, said pivotal mounting of the support providing movement of the second vacuum cup from a first position away from the top surface of the pair of matched sheets to a second position in contact with said top surface, a second vacuum-cup-actuating means to secure the second vacuum cup to the top surface of the supported pair of matched sheets, and means mounted on the supporting structure for operating said first and second vacuum-cup-actuating means and to move said support about its pivotal axis during movement of the carriage by the conveyor means.

3. An apparatus for preparing a composite assembly comprising two matched curved sheets of glass and a thermoplastic interlayer, which comprises a carriage, a supporting structure, conveyor means mounted on the supporting structure for moving the carriage in a cyclic path, a portion of the path being in a horizontal plane, a first vacuum cup mounted on the carriage to support a pair of matched curved glass sheets, a first vacuum-cup-actuating means mounted on the carriage and connected to the first vacuum cup to secure the first vacuum cup to the undersurface of the supported pair of matched sheets, a support pivotally mounted to the carriage, a second vacuum cup mounted on the support, said pivotal mounting of the support providing movement of the second vacuum cup from a first position away from the top surface of the pair of matched sheets to a second position in contact with said top surface, a second vacuum-cup-actuating means mounted on the carriage and connected to the second vacuum cup to secure the second vacuum cup to the top surface of the supported pair of matched sheets, and means mounted on the supporting structure for operating said first and second vacuum-cup-actuating means and to move said support about its pivotal axis during movement of the carriage by the conveyor means.

4. An apparatus for preparing a composite assembly comprising two matched curved sheets of glass and a thermoplastic interlayer, which comprises a carriage, a supporting structure, conveyor means mounted on the supporting structure for moving the carriage in a cyclic path, a portion of the path being in a horizontal plane, a first vacuum cup mounted on the carriage to support a pair of matched curved glass sheets, a first vacuum-cup-actuating means mounted on the carriage and connected to the first vacuum cup to secure the first vacuum cup to the undersurface of the supported pair of matched sheets, a plate slidably mounted on the carriage, an arm pivotally mounted on the plate, a second vacuum cup mounted on the arm, said plate and arm providing movement of the second vacuum cup from a first position away from the top surface of the pair of matched sheets to a second position in contact with said top surface, a second vacuum-cup-actuating means mounted on the carriage and connected to the second vacuum cup to secure the second vacuum cup to the top surface of the supported pair of matched sheets, and means mounted on the supporting structure for operating said first and second vacuum-cup-actuating means and to move said plate and arm during movement of the carriage by the conveyor means.

5. The apparatus of claim 4 wherein said means for operating said vacuum cups and to move said plate and arm includes a first cam means, a second cam means, a third cam means and a fourth cam means, said first cam means being mounted on the supporting structure to operate the first vacuum-cup-actuating means during the movement of the carriage in the horizontal plane, said second cam means being mounted on the supporting structure to lower and raise the arm twice in the movement of the carriage in the horizontal plane, said third cam means being mounted on the supporting structure to move the plate successively down, up, down and up during the movement of the carriage in the horizontal plane, and said fourth cam means being mounted on the supporting structure to operate the second vacuum-cup-actuating means during movement of the carriage in the horizontal plane.

6. The apparatus of claim 5 wherein the first, second, third, and fourth cam means are cam rails mounted longitudinally of the conveyor and having contours to provide successively operation of the first vacuum-cup-actuating means to secure the first vacuum cup to the undersurface of the pair of matched sheets, lowering of the arm, lowering of the plate, operation of the second vacuum-cup-actuating means to secure the second vacuum cup to the top surface of the pair of matched sheets, raising of the plate, raising of the arm, lowering of the arm, lowering of the plate, operation of the second vacuum-cup-actuating means to release the second vacuum cup, raising of the plate, raising of the arm, and operation of the first vacuum-cup-actuating means to release the first vacuum cup.

7. An apparatus for preparing a composite assembly comprising two matched curved sheets of glass and a thermo-plastic interlayer, which comprises a carriage, a supporting structure, conveyor means mounted on the supporting structure for moving the carriage, a first vacuum cup mounted on the carriage to support a pair of matched curved glass sheets, a first vacuum-cup-actuating means to secure the first vacuum cup to the undersurface of the supported pair of matched sheets, a first means mounted on the supporting structure to operate said first vacuum-cup-actuating means, a support, a second means mounted on the supporting structure to move said support, a second vacuum cup mounted on the support, said support being movably mounted on the carriage to move the second vacuum cup from a first position away from the top surface of the pair of matched sheets to a second position in contact with said top surface, a second vacuum-cup-actuating means to secure the second vacuum cup to the top surface of the supported pair of matched sheets, and a third means mounted on the supporting structure to operate said second vacuum-cup-actuating means.

8. An apparatus for preparing a composite assembly comprising two matched curved sheets of glass and a thermo-plastic interlayer, which comprises a carriage, a supporting structure, conveyor means mounted on the supporting structure for moving the carriage, a first vacuum cup mounted on the carriage to support a pair of matched curved glass sheets, a first vacuum-cup-actuating means to secure the first vacuum cup to the undersurface of the supported pair of matched sheets, a first means to operate the first vacuum-cup-actuating means during movement of the carriage by the conveyor in a horizontal plane, a support, a second means to lower and raise the support twice in the movement of the carriage in the horizontal plane, a second vacuum cup mounted on the support, said support being movably mounted on the carriage to move the second vacuum cup from a first position away from the top surface of the pair of matched sheets to a second position in contact with said top surface, a second vacuum-cup-actuating means to secure the second vacuum cup to the top surface of the supported pair of matched sheets, and a third means to operate said second vacuum-cup-actuating means during movement of the carriage in the horizontal plane, said means for moving the support providing the first raising and the second lowering during the actuation of said vacuum cup.

9. An apparatus for preparing a composite assembly comprising two matched curved sheets of glass and a thermoplastic interlayer, which comprises a supporting structure to support a pair of matched curved glass sheets, a first vacuum cup, a support for the first vacuum cup mounted on the supporting structure, a first vacuum-cup-actuating means to secure the first vacuum cup to the under surface of the supported pair of matched sheets, a second vacuum cup, a support for the second vacuum cup movably mounted on the supporting structure to move the second vacuum cup from a first position away from the top surface of the pair of matched sheets to a second position in contact with said top surface, means for moving the support for the second vacuum cup, and a second vacuum-cup-actuating means to secure the second vacuum cup to the top surface of the supported pair of matched sheets, said support for the second vacuum cup in the second position being spaced from the support for the first vacuum cup.

10. An apparatus for preparing a composite assembly comprising two matched curved sheets of glass and a thermoplastic interlayer, which comprises a supporting structure to support a pair of matched curved glass sheets, a first vacuum cup, a support for the first vacuum cup mounted on the supporting structure, a first vacuum-cup-actuating means to secure the first vacuum cup to the under surface of the supported pair of matched sheets, a second vacuum cup, a support for the second vacuum cup, a support means movably mounted on the supporting structure and pivotally mounting the support for the second vacuum cup, said support means and said support for the second vacuum cup providing movement of the second vacuum cup from a first position away from the top surface of the pair of matched sheets to a second position in contact with said top surface, means for moving the support means for the second vacuum cup support, means for moving the support for the second vacuum cup about its pivotal axis, and a second vacuum-cup-actuating means to secure the second vacuum cup to the top surface of the supported pair of matched sheets.

11. An apparatus for preparing a composite assembly comprising two matched curved sheets of glass and a thermoplastic interlayer, which comprises a supporting structure to support a pair of matched curved glass sheets, a first vacuum cup, a support for the first vacuum cup mounted on the supporting structure, a first vacuum-cup-actuating means to secure the first vacuum cup to the under surface of the supported pair of matched sheets, a second vacuum cup, an arm support for the second vacuum cup, a plate slidably mounted on the supporting structure and pivotally mounting the support for the second vacuum cup, said arm and plate providing movement of the second vacuum cup from a first position away from the top surface of the pair of matched sheets to a second position in contact with said top surface, means for moving the plate, means for moving the arm about its pivotal axis, and a second vacuum-cup-actuating means to secure the second vacuum cup to the top surface of the supported pair of matched sheets.

12. An apparatus for preparing a composite assembly comprising two matched curved sheets of glass and a thermoplastic interlayer, which comprises first vacuum engaging means to support a glass sheet on its under side, second vacuum engaging means to support a glass sheet on its upper side, means to continuously move said first and second means in the same direction at the same velocity in that direction, means to move the second means to and from a position above the first means, and means to operatively connect the means to continuously move said first and second means in the same direction at the same velocity in that direction to the means to move the second means to and from said position above the first means in response to said movement of said first and second means in the same direction at the same velocity in that direction.

References Cited in the file of this patent

UNITED STATES PATENTS

| | | |
|---|---|---|
| 1,729,125 | Reece | Sept. 24, 1929 |
| 2,064,514 | Balz | Dec. 15, 1936 |
| 2,091,331 | Owen | Aug. 31, 1937 |
| 2,205,003 | Walters | June 18, 1940 |
| 2,377,849 | Binkert et al. | June 12, 1945 |
| 2,668,383 | Germany | Feb. 9, 1954 |
| 2,668,384 | Barker | Feb. 9, 1954 |
| 2,697,676 | Black et al. | Dec. 21, 1954 |